United States Patent
Li et al.

(10) Patent No.: US 8,963,897 B2
(45) Date of Patent: Feb. 24, 2015

(54) DISPLAY DEVICE WITH PIXELS OF DIFFERING DISPLAY TYPES AND FABRICATION METHOD THEREOF

(75) Inventors: Shao-Bing Li, Suzhou (CN); Han-Min Zhang, Suzhou (CN)

(73) Assignees: Au Optronics (Suzhou) Corp., Ltd., Suzhou (CN); Au Optronics Corp., Hsin-Chu (TW)

( * ) Notice: Subject to any disclaimer, the term of this patent is extended or adjusted under 35 U.S.C. 154(b) by 149 days.

(21) Appl. No.: 13/491,046

(22) Filed: Jun. 7, 2012

(65) Prior Publication Data

US 2013/0050066 A1     Feb. 28, 2013

(30) Foreign Application Priority Data

Aug. 26, 2011   (CN) .......................... 2011 1 0248205

(51) Int. Cl.
  G09G 5/00      (2006.01)
  G09G 3/34      (2006.01)
  G02F 1/167     (2006.01)
  G02F 1/13      (2006.01)

(52) U.S. Cl.
  CPC ...... *G02F 1/167* (2013.01); *G02F 1/13* (2013.01); G02F 2201/44 (2013.01)
  USPC .......................................... 345/204; 345/107

(58) Field of Classification Search
  CPC ... G09G 3/32; G09G 3/344; G09G 2300/046; G09G 2300/0456
  USPC ................................................. 345/204, 107
  See application file for complete search history.

(56) References Cited

U.S. PATENT DOCUMENTS

| | | | |
|---|---|---|---|
| 4,580,877 A * | 4/1986 | Washo | 349/69 |
| 7,748,634 B1 | 7/2010 | Zehr et al. | |
| 2003/0052869 A1* | 3/2003 | Fujii et al. | 345/204 |
| 2003/0112391 A1* | 6/2003 | Jang et al. | 349/114 |
| 2003/0193457 A1* | 10/2003 | Wang et al. | 345/84 |
| 2005/0012879 A1* | 1/2005 | Lin | 349/114 |
| 2005/0151902 A1* | 7/2005 | Wang et al. | 349/114 |
| 2007/0046182 A1* | 3/2007 | Chen et al. | 313/504 |
| 2007/0153172 A1* | 7/2007 | Hsieh et al. | 349/114 |
| 2008/0013024 A1* | 1/2008 | Lin et al. | 349/114 |
| 2008/0122783 A1* | 5/2008 | Jung et al. | 345/107 |
| 2009/0082067 A1 | 3/2009 | Song | |

(Continued)

FOREIGN PATENT DOCUMENTS

CN     1988169      6/2007
CN     101211962    7/2008

(Continued)

*Primary Examiner* — Claire X Pappas
*Assistant Examiner* — Robert Stone
(74) *Attorney, Agent, or Firm* — WPAT, PC; Justin King

(57) ABSTRACT

An exemplary display device includes a substrate, a plurality of first and second pixel units, a first display layer, a second display layer, a spacer and a first color filter. The substrate has a first and a second display region. The first and second pixel units are disposed in the first and second display regions, respectively. The first display layer and the second display layer are disposed on the first and second pixel units, respectively. The first display region is surrounded by the spacer therefore the first display layer is separated from the second display layer. The first color filter is disposed on the first display layer. The first display layer and the second display layer are based on different displaying mechanisms. Therefore, the display device has the advantages of both the first display layer and the second display layer.

7 Claims, 11 Drawing Sheets

(56) References Cited

U.S. PATENT DOCUMENTS

| | | |
|---|---|---|
| 2009/0185098 A1 | 7/2009 | Bae et al. |
| 2010/0149469 A1* | 6/2010 | Hunt .............................. 349/114 |
| 2010/0302483 A1* | 12/2010 | Peng et al. .................... 349/106 |
| 2010/0308321 A1* | 12/2010 | Tano et al. ....................... 257/40 |
| 2011/0043435 A1* | 2/2011 | Hebenstreit et al. .............. 345/5 |
| 2011/0115769 A1* | 5/2011 | Hsieh et al. ................... 345/211 |

FOREIGN PATENT DOCUMENTS

| | | |
|---|---|---|
| CN | 101393367 A | 3/2009 |
| CN | 102289127 | 12/2011 |
| TW | I317928 | 12/2009 |

\* cited by examiner

DISPLAY DEVICE WITH PIXELS OF DIFFERING DISPLAY TYPES AND FABRICATION METHOD THEREOF

TECHNICAL FIELD

The present inventions relates to a display device and a fabricating method thereof, and more particularly to a display device having characteristics of different types of displaying techniques.

BACKGROUND

With the development of display technology, flat-panel displays have become more and more popular due to their attractive advantages such as very light weight, high portability and less power consumption, etc. Basically, flat-panel displays are commonly categorized into liquid crystal displays (LCDs), organic light emitting diode displays (OLEDs) and electrophoretic displays (EPDs). Compared with electrophoretic displays, liquid crystal displays and organic light emitting diode displays have advantages of higher image quality, higher space usage efficiency, lower power consumption and no radiation, and thus liquid crystal displays and organic light emitting diode displays have been widely applied in various electronic devices.

On the other hand, electrophoretic displays have the characteristic of bi-stability and thus there is no need to provide additional light sources in electrophoretic displays. As a result, the electrophoretic displays consumes less power, as well as have more compact structure. In other words, the electrophoretic displays meet the demand of minimization and energy-saving of electronic devices. Therefore, the electrophoretic displays are also getting more and more popular nowadays.

However, exactly due to the bi-stability feature the electrophoretic displays are usually adapted for displaying static texts or images but not suitable for displaying videos and animations of high frame rates. Therefore, it is highly desirable to provide a display device that is capable of display videos or animations while still has the advantage of highly energy-saving.

SUMMARY OF EMBODIMENTS

An embodiment of the disclosure provides a display device, which includes a substrate, a plurality of first pixel units, a plurality of second pixel units, a first display layer, a second display layer and a spacer. The substrate has a first display region and a second display region. The first pixel units are disposed in the first display region. The second pixel units are disposed in the second display region. The first display layer is disposed on the first pixel units. The second display layer is disposed on the second pixel units. The spacer is disposed to surround the first display region thereby separating the first display layer from the second display layer.

In another aspect, an embodiment of the disclosure provides a fabricating method for a display device. The fabricating method comprises steps of: providing a substrate having a first display region and a second display region; forming a plurality of first pixel units in the first display region; forming a plurality of second pixel units in the second display region; forming a spacer to surround the first display region; forming a first display layer in the first display region to cover the first pixel units; attaching a first color filter on the first display layer; and forming a second display layer in the second display region to cover the second pixel units.

BRIEF DESCRIPTION OF THE DRAWINGS

The above embodiments will become more readily apparent to those ordinarily skilled in the art after reviewing the following detailed description and accompanying drawings, in which.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Figure 1A:
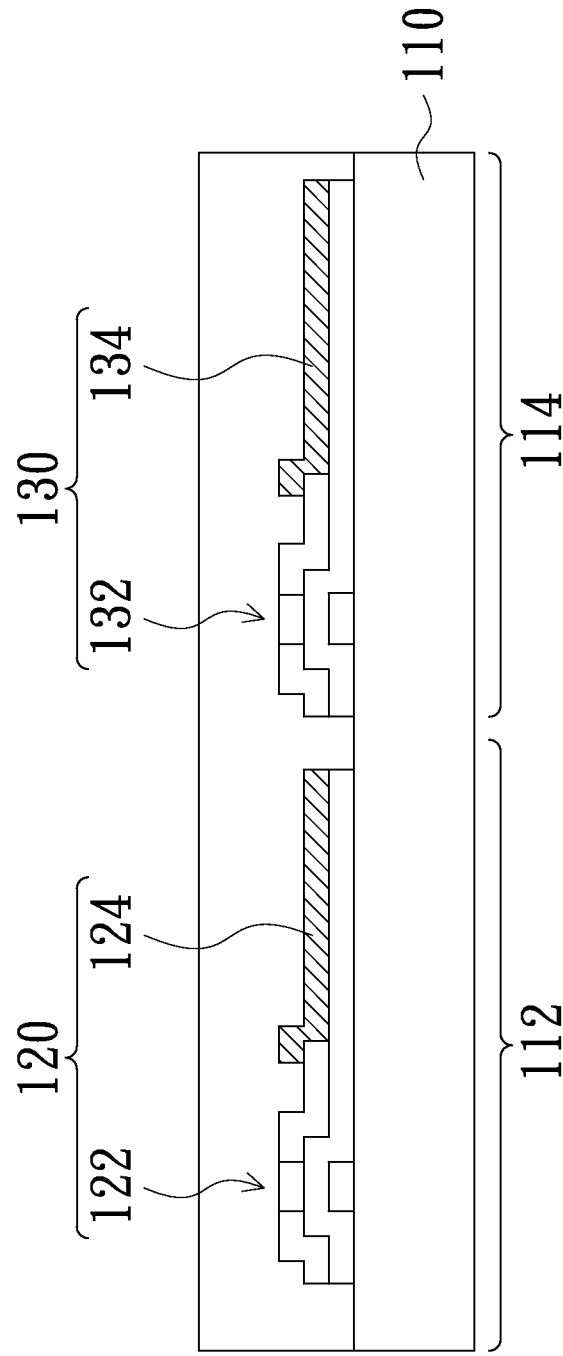
FIGS. 1A, 1B and 1C are schematic cross-sectional views illustrating a fabricating method for a display device in accordance with an embodiment of the disclosure.
Figure 1B:
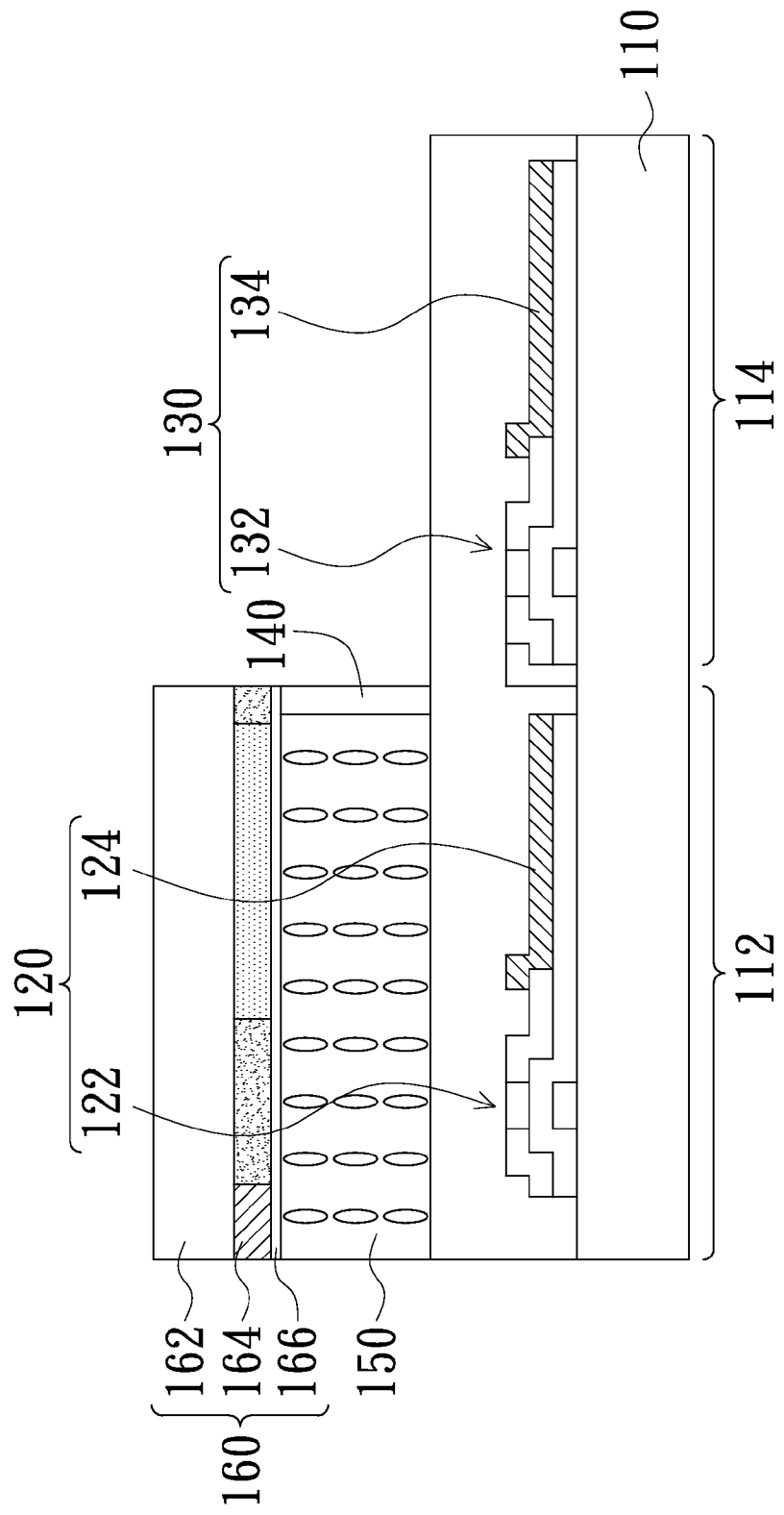
Figure 1C:
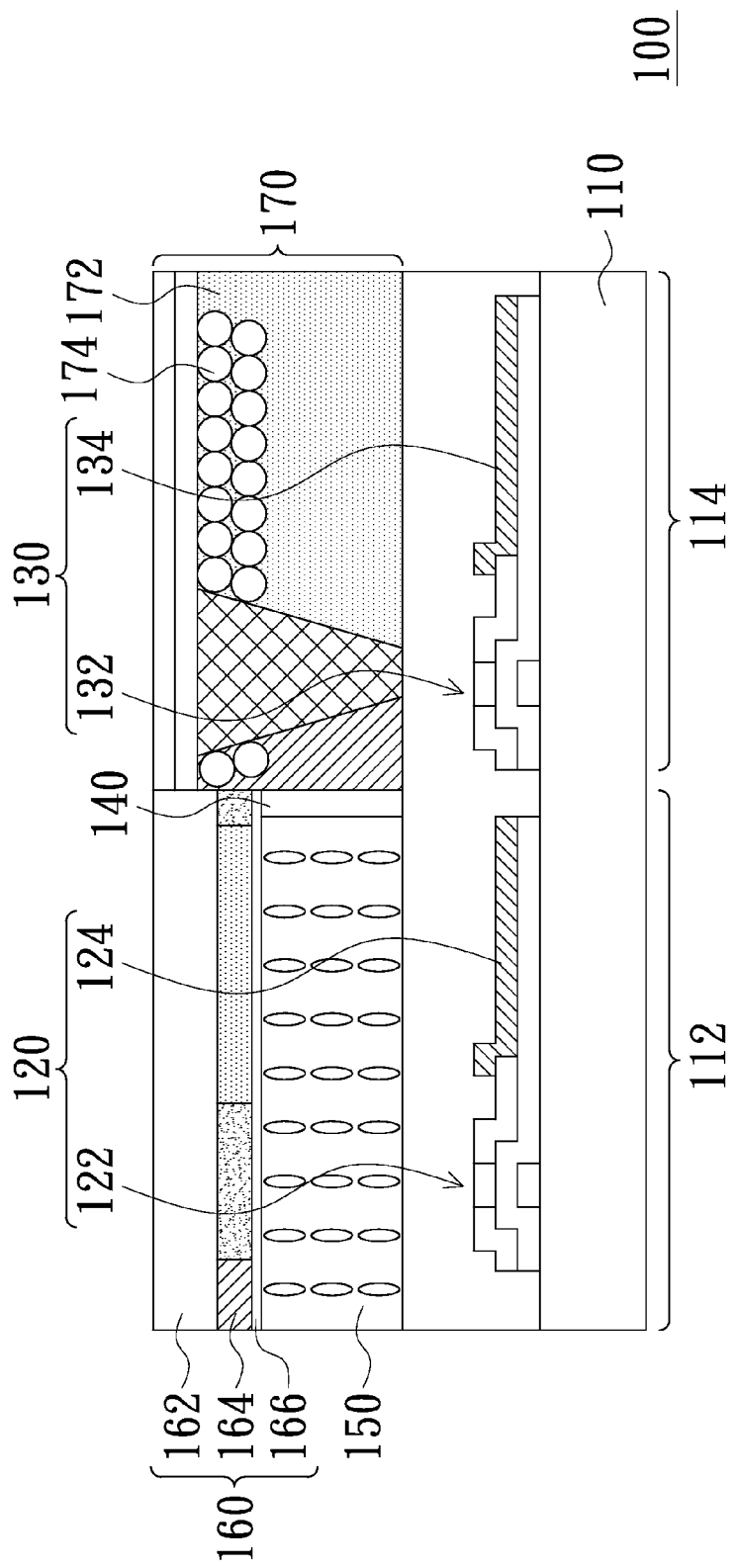

FIGS. 1A, 1B and 1C are schematic cross-sectional views illustrating a fabricating method of a display device in accordance with an embodiment of the present disclosure. As illustrated in FIG. 1A, a substrate 110 is first provided, and the substrate 110 is defined to have a first display region 112 and a second display region 114. Afterwards, a plurality of first pixel units 120 and a plurality of second pixel units 130 are formed in the first display region 112 and the second display region 114 of the substrate 110, respectively. In order to make the FIG. 1A simpler, it is noted that only one first pixel unit 120 and one second pixel unit 130 are illustrated.

In detail, each of the first pixel units 120 comprises a first thin film transistor (TFT) 122 and a first pixel electrode 124, and each of the second pixel units 130 comprises a second thin film transistor 132 and a second pixel electrode 134. In the present embodiment, the formation of the first and second pixel units 120, 130, for example, can be realized by first forming these first thin film transistors 122 in the first display region 112 and then forming these second thin film transistors 132 in the second display region 114.

Specifically, these first thin film transistors 122, for example, are same as or similar to the second thin film transistors 132. Thus, the first thin film transistors 122 and the second thin film transistors 132 can be formed simultaneously in a same fabricating process. It is noted that data lines and scan lines, which are electrically coupled to the first and second thin film transistors 122, 132, may be also formed simultaneously with the first and second thin film transistors 122, 132 in the same fabricating process. To make FIG. 1A simpler and clearer, these data lines and scan lines are not shown; however, the fabricating process and the positions of the data and scan lines in the display device are apparent to those ordinarily skilled in the art, and thereby are not described in detail.

Then, a plurality of first pixel electrodes 124 are formed in the first display region 112, and the first pixel electrodes 124 are electrically coupled to the first thin film transistors 122 with one to one correspondence. Based on a same manner, a plurality of second pixel electrodes 134 are formed in the second display region 114, and the second pixel electrodes 134 are electrically coupled to the second thin film transistors 132 with one to one correspondence.

It is noted that in the present embodiment the first and second pixel electrodes 124, 134, for example, consist of a light-tight metal material which can reflect lights. In other words, the display device fabricated according to the present embodiment is a reflective display device.

Please refer to FIG. 1B, a spacer 140 is formed on the substrate 110 to surround the first display region 112. For example, the spacer 140 extends along a boundary of the first display region 112 to define a receiving space for receiving liquid crystal. In the embodiment, the spacer 140, for example, consists of a material same as, or similar to, the sealant used in a liquid crystal display panel. Afterwards, a liquid crystal display layer 150 is formed in the receiving space on the first display region 112 to cover the first pixel units 120. Specifically, the formation of the liquid crystal display layer 150, for example, can be achieved by the one drop filling (ODF) method. A first color filter 160 is then attached on the liquid crystal display layer 150 after the liquid crystal display layer 150 is formed. Accordingly, the liquid crystal display layer 150 is enclosed by the spacer 140, the substrate 110 and the first color filter 160. In particular, the first color filter 160, for example, includes or consists of a transparent substrate 162, a color resist layer 164 and a transparent electrode layer 166. The color resist layer 164 and the transparent electrode layer 166 are sequentially disposed on the transparent substrate 162, and the transparent electrode layer 166 is disposed between the liquid crystal display layer 150 and the color resist layer 164.

Figure 2:
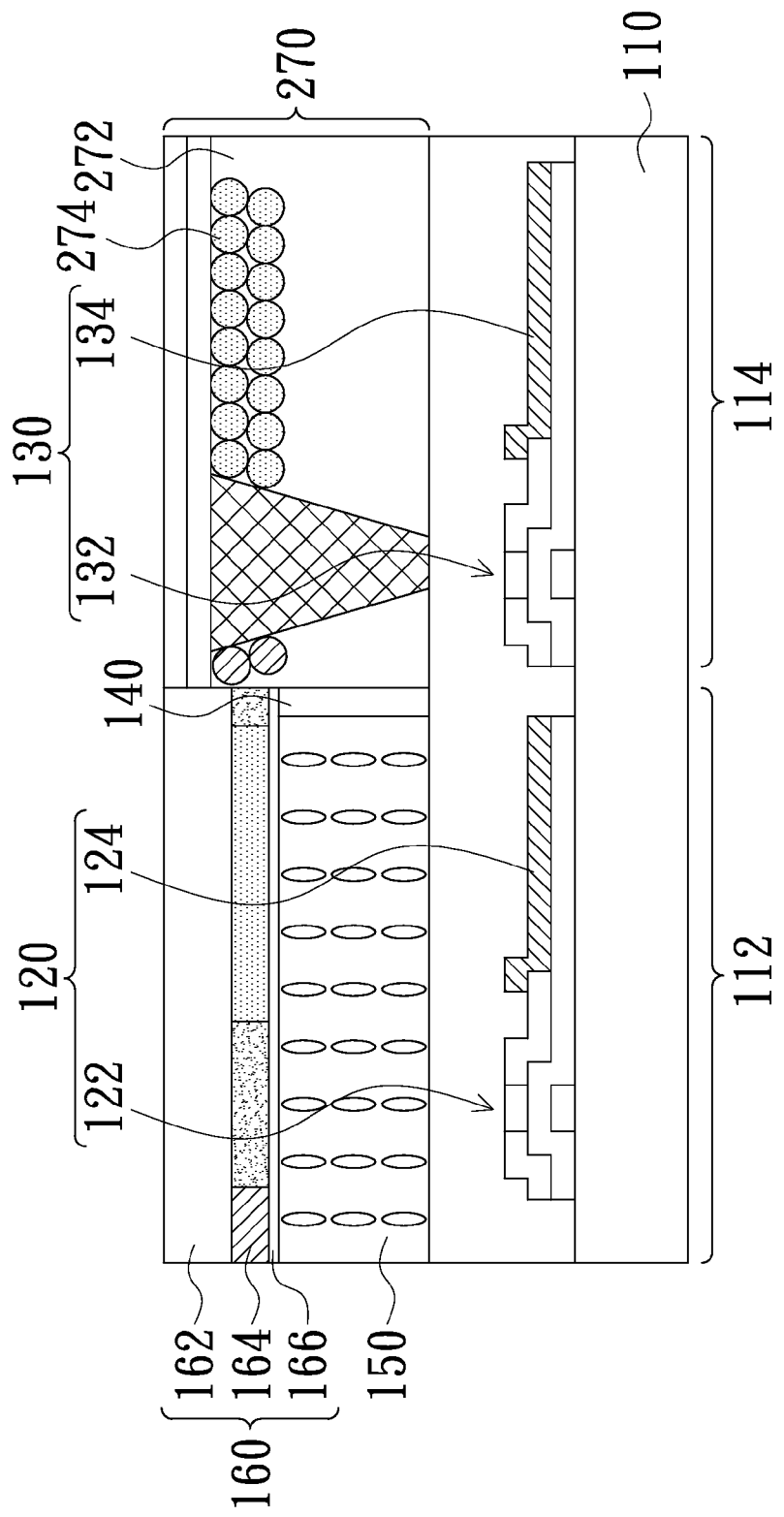
FIG. 2 is a schematic cross-sectional view of a display device in accordance with another embodiment of the disclosure.

Please refer to FIG. 1C, the display device 100 is roughly completed after an electrophoretic display layer 170 is disposed in the second display region 114 to cover the second pixel units 130. The electrophoretic display layer 170, for example, is a micro-cup or a micro-capsule electrophoretic display layer. Furthermore, the electrophoretic display layer 170 in the present embodiment, for example, is a display layer that can display a colored image. For example, the electrophoretic display layer 170 may include or consist of a colored electrophoretic fluid 172 and a plurality of white charged micro particles 174, as shown in FIG. 1C. The electrophoretic display layer 270 may also include or consists of a black electrophoretic fluid 272 and a plurality of colored charged micro particles 274, as shown in FIG. 2. In addition, the colored electrophoretic fluid 172 and the colored charged micro particles 274 may have a color of red, green, blue, cyan, yellow or magenta. Therefore, the display device 100 can have two different display layers (for example, the liquid crystal display layer 150 and the electrophoretic display layer 170) both on a same substrate 110 at a same time.

Figure 3:
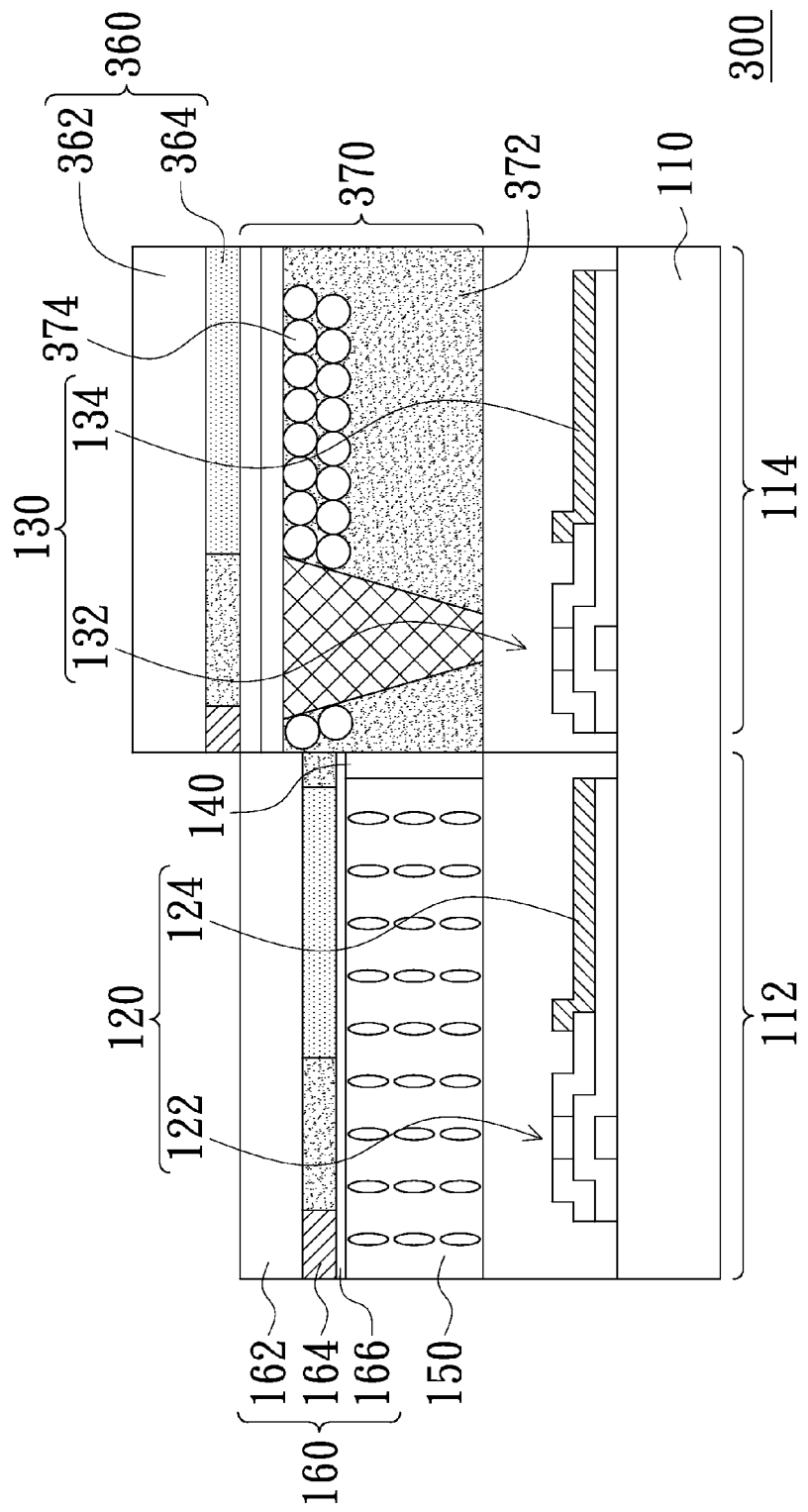
FIG. 3 is a schematic cross-sectional view of a display device in accordance with still another embodiment of the disclosure.

Besides, in other embodiments, as illustrated in FIG. 3, an electrophoretic display layer 370 includes a black electrophoretic fluid 372 and white charged micro particles 374. On this condition, a second color filter 360 may be disposed on the electrophoretic display layer 370 such that both the first and second display regions are capable of displaying colored images. The second color filter 360, for example, includes a transparent substrate 362 and a color resist layer 364, and the color resist layer 364 is disposed on the substrate 362.

Please refer back to FIG. 1C, as mentioned above, the display device 100 is a reflective display device if the first pixel electrodes 124 and second pixel electrodes 134 are made from a light-tight metal material; however, it is to be understood that the disclosure needs not be limited to the disclosed embodiment. That is, the display device of the present disclosure can also be a transflective display device in other embodiments. More details will be given in the following embodiments.

Figure 4:
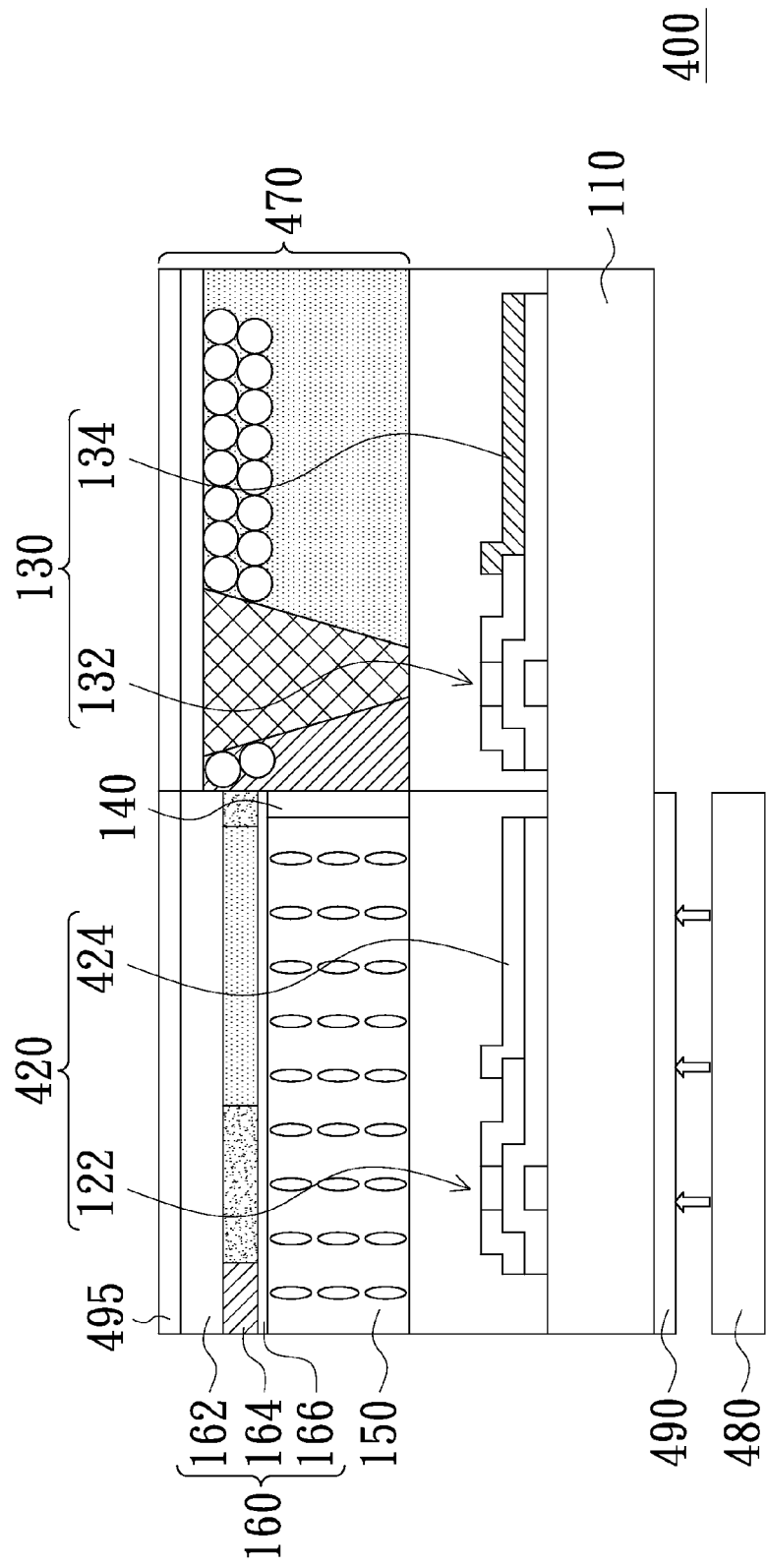
FIG. 4 is a schematic cross-sectional view of a display device in accordance with yet another embodiment of the disclosure.

FIG. 4 is a schematic cross-sectional view of a display device in accordance with another embodiment of the present disclosure. As shown in FIG. 4, a first pixel unit 420 in the present embodiment comprises a first thin film transistor 122 and a first pixel electrode 424, and the first pixel electrode 424, for example, consists of indium tin oxide (ITO), indium zinc oxide (IZO) or other light-pervious (i.e., transparent) metal oxides. Accordingly, in the present embodiment, the first pixel electrode 424 and the second pixel electrode 134 are respectively formed in different fabricating processes; however, the present invention needs not to limit the fabricating sequence of the first pixel electrode 424 and the second pixel electrode 134.

Therefore, a light source must be disposed under the first pixel units 420 for providing lights that can penetrate through the liquid crystal display layer 150, so the display device 400 can display images. In particular, a backlight module 480 is disposed under the substrate 110 and corresponding to the first pixel units 420 thereby providing the lights needed by the first pixel units 420 for displaying images. The backlight module 480 can be of a direct type or an edge lighting type, it is to be understood that the disclosure needs not be limited to the disclosed embodiment.

Additionally, the display device 400 in the present embodiment has a first polarizing plate 490 disposed between the backlight module 480 and the substrate 110 and has a second polarizing plate 495 disposed on the first color filter 160. In the present embodiment, the electrophoretic display layer 470, for example, is disposed in the second display region 114 of the substrate 110 after the attachment of the first polarizing plate 490 and the second polarizing plate 495. As such, the potential risk of the damage of the electrophoretic display layer 470 during the attaching process of the first polarizing plate 490 and the second polarizing plate 495 is avoided.

As mentioned above, the electrophoretic display layer 470 of the display device 400 can be either a colored electrophoretic display layer or a monochrome electrophoretic display layer. A color filter (not shown) may be disposed on the electrophoretic display layer 470 if the electrophoretic display layer 470 is formed with a monochrome electrophoretic fluid and charged particles.

Figure 5A:
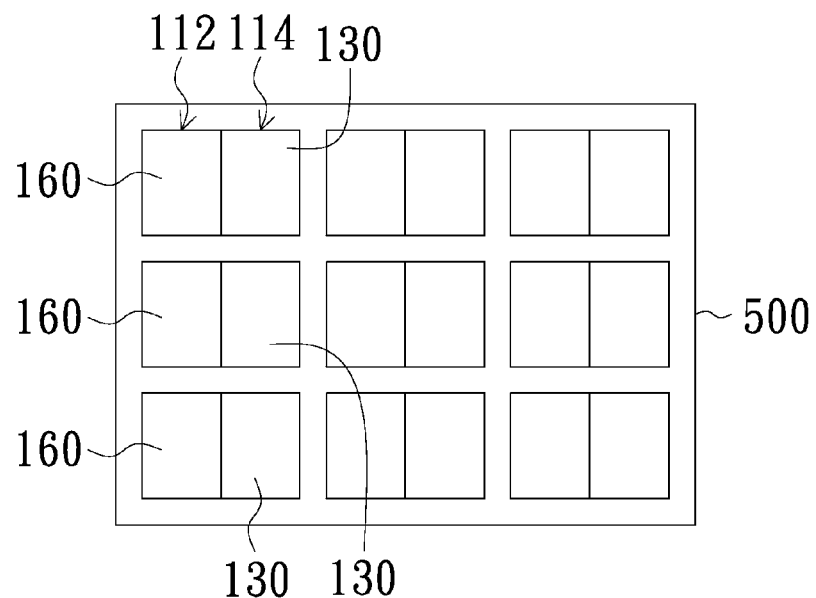
FIGS. 5A and 5B are schematic views illustrating a display device during partial steps of a fabricating process thereof in accordance with another embodiment of the disclosure.

It is worthy to note that in the aforementioned fabricating process, only one single display device is formed on the substrate; however, this is just an example, and the present disclosure is not limited to this manner. For example, in other embodiments, as illustrated in FIG. 5A, a number of structures similar to that shown in FIG. 1B are formed on a large-scale mother substrate 500 simultaneously. At this time, the color filter 160 is already disposed in each of the first display regions 112 and each of the second display regions 114 is only configured with a number of second pixel units 130. Besides, it is noted that the color filter 160 can be directly disposed on the liquid crystal display layer 150 without an extra cutting process if the color filter 160 has a size fit to the first display region 112. Alternatively, an extra cutting process is needed for removing a portion of the color filter deposed above the second display region 114 if the color filter 160 extends into the second display region 114.

Figure 5B:
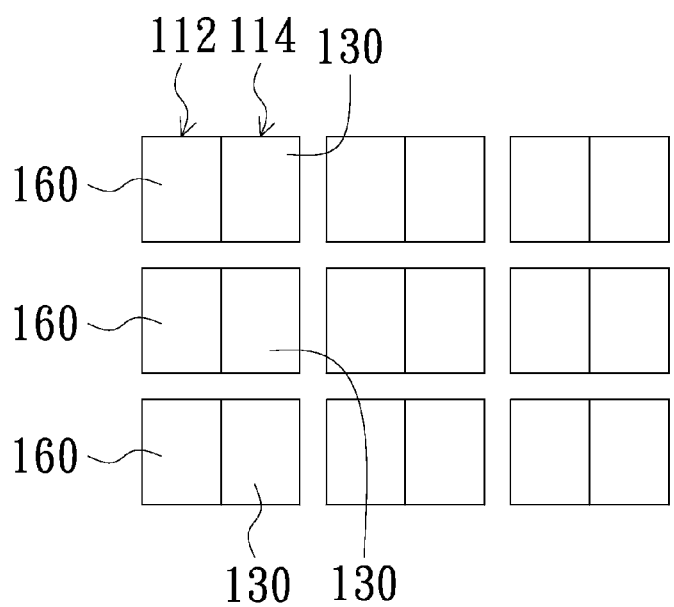

Afterwards, as shown in FIG. 5B, after a cutting process, a plurality of individual display devices are obtained, and each individual display device has a same structure as shown in FIG. 1B. Specifically, if the color filter covers both the first and second display regions 112, 114, a second cutting process should be performed on each of the plurality of individual display devices after the cutting process shown in FIG. 5B to remove the portion of the color filter that covers the second display region 114. Afterwards, a process similar to that shown in in FIG. 1C is performed on each of the individual display devices.

Figure 6A:
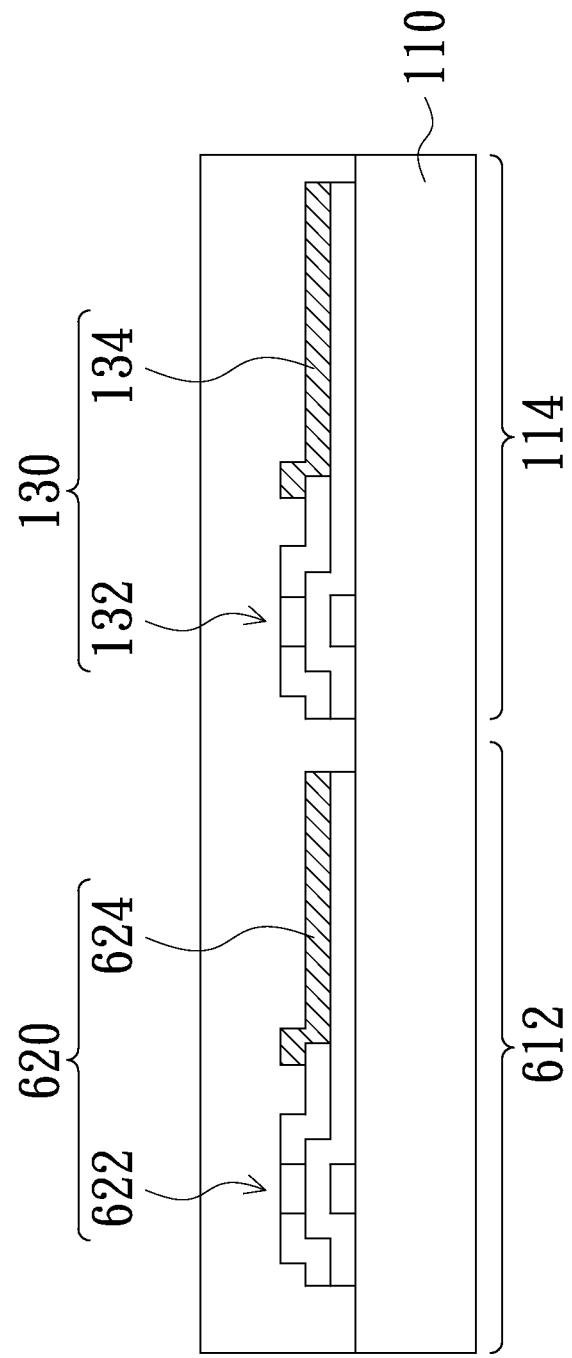
FIGS. 6A, 6B and 6C are schematic cross-sectional views illustrating a fabricating method for a display device in accordance with an embodiment of the disclosure.
Figure 6B:
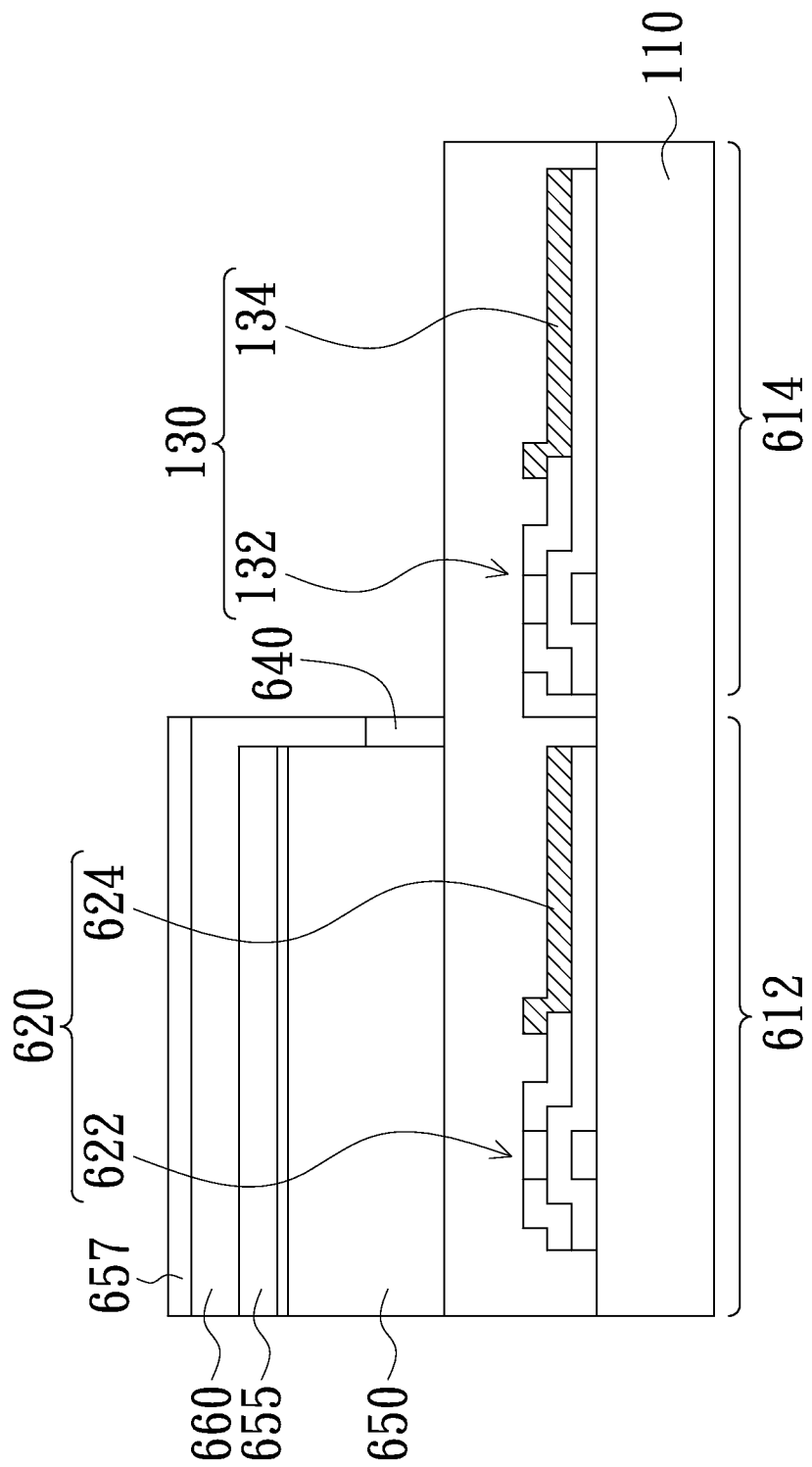
Figure 6C:
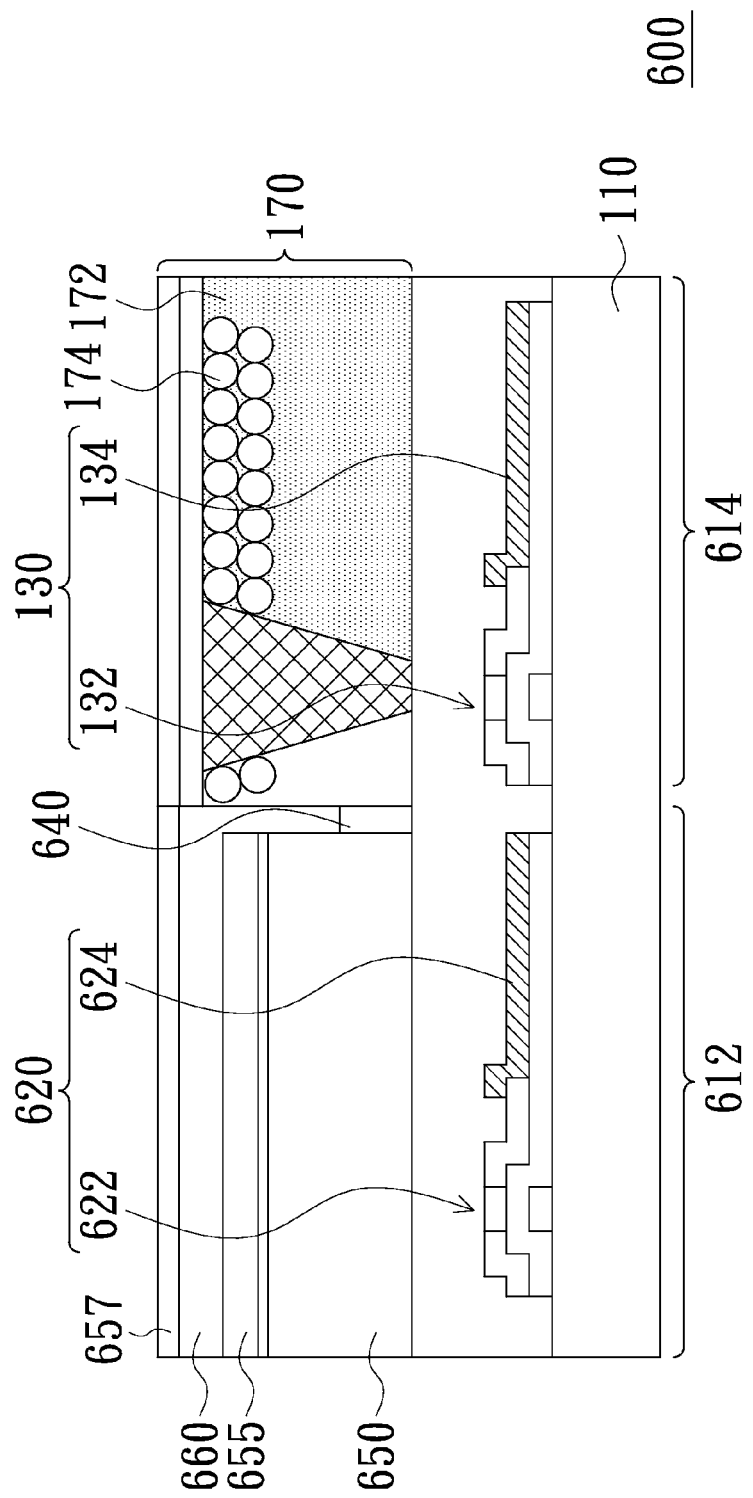

In the display device 100, it is to be noted that the liquid crystal display panel in the first display region 112 can be replaced by other types of display panels such as an organic light emitting diode (OLED) display panel. FIGS. 6A, 6B and 6C are schematic cross-sectional views illustrating a fabricating method of a display device in accordance with another embodiment of the present disclosure. As illustrated in FIG. 6A, the substrate 110 is first provided, and the substrate 110 is defined to have a third display region 612 corresponding to an organic light emitting diode display structure and the second display region 114 corresponding to an electrophoretic display structure. Besides, the second display region 114 has been described in the aforementioned embodiments, the flowing description of the present embodiment will be only focused on the third display region 612. Afterwards, a plurality of third pixel units 620 are formed in the third display region 612. In order to make the FIG. 6A simpler, it is noted that only one third pixel unit 620 are illustrated.

In detail, each of the third pixel units 620 includes a third thin film transistor 622 and a third pixel electrode 624. In the present embodiment, the formation of the third and second pixel units 620, 130, for example, can be realized by first forming these third thin film transistors 622 in the third display region 612 and then forming these second thin film transistors 132 in the second display region 114.

Specifically, these third thin film transistors 622, for example, are same as or similar to the second thin film transistors 132. Thus, the third thin film transistors 622 and the second thin film transistors 132 can be formed simultaneously in a same fabricating process. It is noted that data lines and scan lines, which are electrically coupled to the third and second thin film transistors 622, 132, may be also formed simultaneously with the third and second thin film transistors 622, 132 in the same fabricating process. To make FIG. 6A simpler and clearer, these data lines and scan lines are not shown; however, the fabricating process and the positions of the data and scan lines in the display device are apparent to those ordinarily skilled in the art, and thereby are not described in detail.

Then, a plurality of third pixel electrodes 624 are formed in the third display region 612, and the third pixel electrodes 624 are electrically coupled to the third thin film transistor 622 with one to one correspondence.

Please refer to FIG. 6B, a spacer 640 is formed on the substrate 110 to surround the third display region 612. Afterwards, an organic light emitting diode display layer 650 is formed within a space on the third display region 612 and surrounded by the spacer 640 so as to cover the third pixel units 620. A fourth pixel electrode 655 is formed on the organic-light emitting diode display layer 650 and a cover 660 is formed on the fourth pixel electrode 655. The cover 660 may consists of transparent materials such as glasses. The spacer 640 and the cover 660 cooperatively enclose the organic light emitting diode display layer 650.

Figure 7:
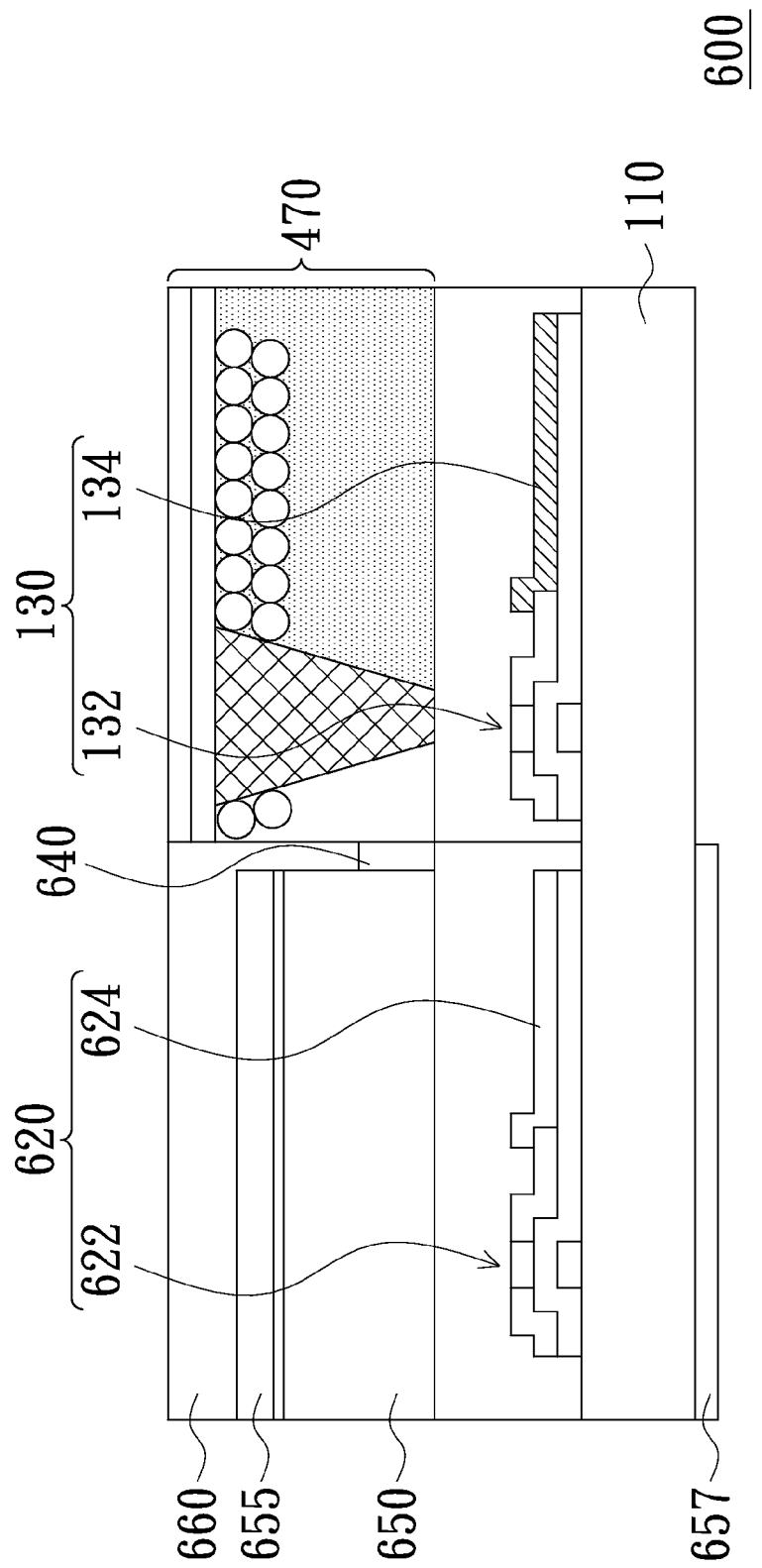
FIG. 7 is a schematic cross-sectional view of a display device in accordance with another embodiment of the disclosure.

Please refer to FIG. 6C, the display device 600 is roughly completed after the electrophoretic display layer 170 is disposed in the second display region 114 to cover the second pixel units 130. Specifically, the organic-light emitting diode display layer 650 is separated from the electrophoretic display layer 170 by the spacer 640 and the cover 660. In addition, if the organic light emitting diode display structure in the third display region 612 is a top transparent type, that is, the third pixel electrode 624 and the second pixel electrode 134 are made of a light-tight metal material and the fourth pixel electrode 655 is made of a light-previous (i.e., transparent) material, a polarizing plate 657 is disposed on the cover 660. In addition, the third pixel electrode 624 and the second pixel electrode 134 can be formed in a same fabricating process. Alternatively, as depicted in FIG. 7, if the organic light emitting diode display structure in the third display region 612 is a bottom transparent type, that is, the fourth pixel electrode 655 and the second pixel electrode 134 are made of a light-tight metal material and the third pixel electrode 624 is made of a light-pervious material, the polarizing plate 657 is disposed under the substrate 110 and corresponding to the third display region 612. In addition, the third pixel electrode 624 and the second pixel electrode 134 are formed in different fabricating processes. Therefore, the display device 600 can have two different display layers (for example, the organic-light emitting diode display layer 650 and the electrophoretic display layer 170) both on a same substrate 110 at a same time.

It is worthy to note that in the aforementioned fabricating process, only one single display device 600 is formed on the substrate; however, this is just an example, and the present disclosure is not limited to this manner. In other words, a number of individual structures similar to that shown in FIG. 6C can be formed on a large-scale mother substrate simultaneously. The process of fabricating a number of individual display devices 600 on a large-scale substrate is similar to that illustrated in FIGS. 5A, 5B, and thus no detail description is given here.

In summary, the display device of the present disclosure includes a liquid crystal display panel or organic light emitting diode display panel capable of displaying a high frame rate videos or images and a bi-stable electrophoretic display panel that is extremely suitable for displaying static images. Therefore, the display device of the present disclosure can utilizes the liquid crystal display panel or organic light emitting diode display panel to display high frame rate videos or images and utilizes the bi-stable electrophoretic display panel to display static information or time. Accordingly, the display device of the present disclosure possesses advantages of high displaying quality for dynamic images and energy-saving displaying for static information.

In addition, because each of the display panels in the display device of the present disclosure shares a same active elements array. Thus, the active elements array can be fabricated in a single process. Accordingly, the fabricating cost is significantly reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A display device, comprising:
    a substrate having a first display region and a second display region;
    a plurality of first pixel units disposed in the first display region;
    a plurality of second pixel units disposed in the second display region;
    a first display layer disposed on the first pixel units;
    a second display layer disposed on the second pixel units, wherein the first display layer and the second display layer are based on different displaying mechanisms, and the first display layer is an organic light emitting diode display layer and the second display layer is an electrophoretic display layer;
    a spacer disposed to surround the first display region thereby separating the first display layer from the second display layer; and
    a cover disposed on the organic light emitting diode display layer wherein the cover and the spacer cooperatively separate the first display layer from the second display layer, and the cover consists of a plurality of glasses.

2. The display device according to claim 1, further comprising a second color filter disposed on the electrophoretic display layer.

3. The display device according to claim 1, wherein the spacer comprises of a sealant material.

4. The display device according to claim 1, wherein each of the first pixel units comprises a third thin film transistor and a third pixel electrode, the third thin film transistor is electrically coupled to a corresponding third pixel electrode, each of the second pixel units comprises a second thin film transistor and a second pixel electrode, the second thin film transistor is electrically coupled to a corresponding second pixel electrode.

5. The display device according to claim 4, wherein if the organic light emitting diode display layer is a top transparent type, the third pixel electrode and the second pixel electrode comprise a light-tight metal, and if the organic light emitting diode display layer is a bottom transparent type, the third pixel electrode comprises a light-pervious metal oxide, and the second pixel electrode comprises a light-tight metal.

6. The display device according to claim 1, wherein the spacer and the cover cooperatively enclose the organic light emitting diode display layer.

7. A fabricating method for a display device, comprising:
    providing a substrate having a first display region and a second display region;
    forming a plurality of first pixel units in the first display region;
    forming a plurality of second pixel units in the second display region;
    forming a spacer to surround the first display region;
    forming a first display layer in the first display region to cover the first pixel units;
    forming a second display layer in the second display region to cover the second pixel units, wherein the first display layer and the second display layer are based on different displaying mechanisms and the first display layer is an organic light emitting diode display layer and the second display layer is an electrophoretic display layer; and
    forming a cover on the organic light emitting diode display layer wherein the spacer and the cover cooperatively separate the first display layer from the second display layer, and the cover consists of a plurality of glasses.

* * * * *